Oct. 17, 1950 — B. D. FIGG — 2,526,017
VALVE
Filed Oct. 18, 1946
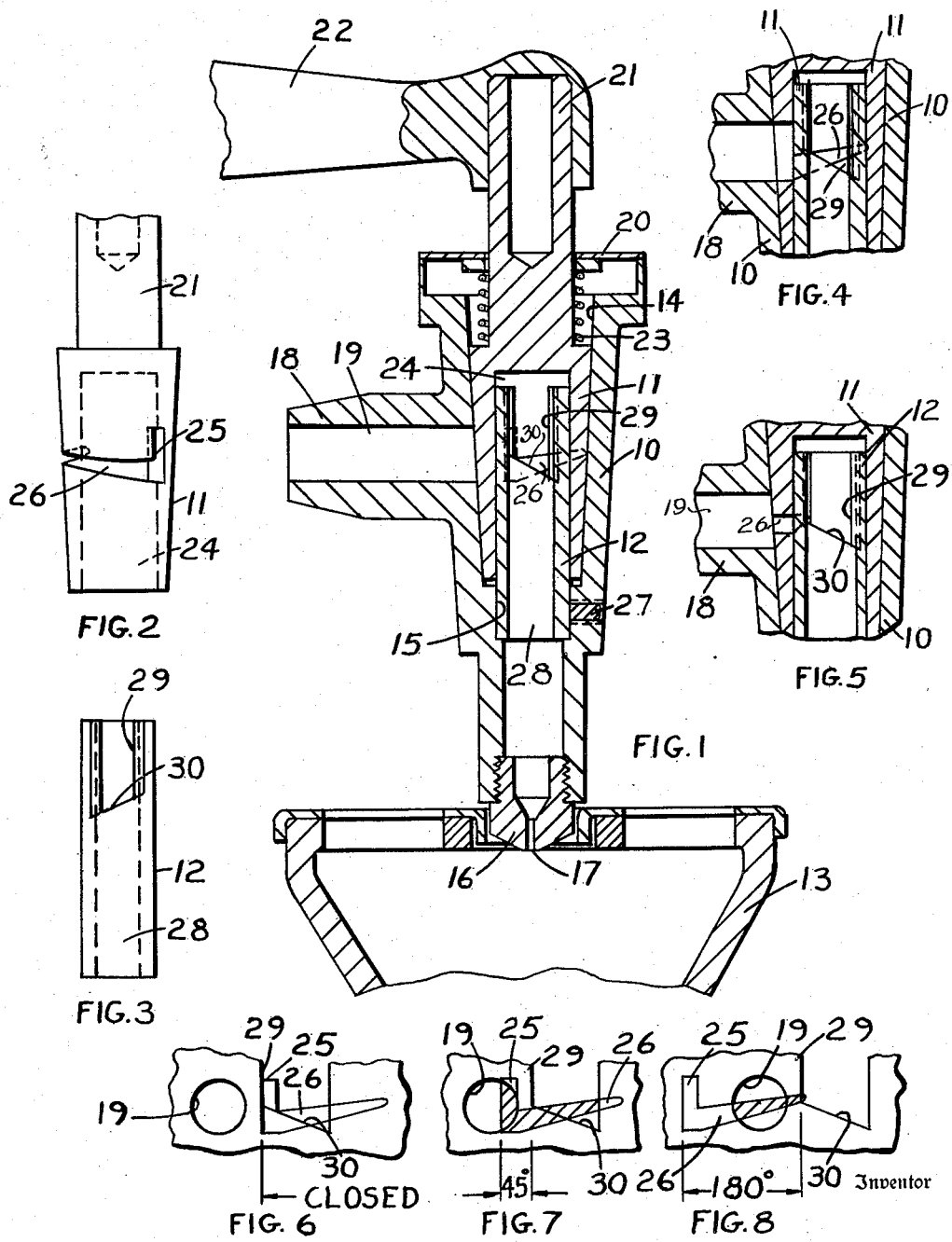
Inventor
BASIL D. FIGG
By Richard A. Parsons, Attorney Patented Oct. 17, 1950

2,526,017

UNITED STATES PATENT OFFICE 2,526,017

VALVE

Basil D. Figg, East Lansing, Mich., assignor to Motor Wheel Corporation, Lansing, Mich., a corporation of Michigan Application October 18, 1946, Serial No. 704,176

5 Claims. (Cl. 251—92)

This invention relates to valves for regulating the flow of gaseous fuels to a burner, and particularly to such valves for use in gas burning cooking ranges.

Valves of the type mentioned are usually of the rotary plug type. Such valves are capable of rotation about 90°, but due to their peculiar characteristics, only a limited part of that rotation is employed for regulating the flow of fuel. Hence, the adjustment of the valves to provide a predetermined flow of fuel is extremely critical.

The principal object of the present invention is to provide a valve of the rotary plug type in which substantially the entire range of rotary movement is utilized in regulating the flow of fuel.

Another object is to provide such a valve in which the rate of flow of fuel is substantially proportioned to the degree of rotation of the valve between its opened and closed positions.

Another object is to provide a valve having these characteristics and in which a positive shut off for fuel is provided.

A still further object is to provide such a valve which, when moved from closed to opened position, opens rapidly and then closes slowly to regulate the flow of fuel.

These objects will more fully appear in the following specification when read in connection with the accompanying drawings, wherein:

Figure 1 is a cross-sectional view of a valve embodying the invention, in closed position;

Figure 2 is a fragmentary elevational view of the valve plug;

Figure 3 is an elevational view of the valve sleeve;

Figure 4 is a fragmentary cross-sectional view of the valve in fully opened position;

Figure 5 is a fragmentary cross-sectional view of the valve in "simmer" position; and Figures 6, 7 and 8 are diagrams of the relative positions of the valve body, valve plug and valve sleeve in closed, fully opened, and "simmer" positions, respectively.

The valve shown in the drawings comprises three principal parts, a valve body 10, a rotary plug 11, and a sleeve 12. The valve is associated with a conventional Venturi mixing tube 13.

The valve body 10 has a bore extending axially therethrough. The axially outer end of the bore 14 is tapered toward the inner end to receive the tapered plug 11 snugly. The axially inner end of the bore is reduced in diameter at 15 to receive the axially inner end of the sleeve 12. A metering plug 16 is threaded into the axially inner end of the valve body. The metering plug 16 is provided with a metering orifice 17, which limits the maximum quantity of gas which can pass through the valve.

At one side of the valve body is a tubular neck 18 by means of which the valve can be connected to a gas main. The neck 18 has a cylindrical passageway 19 therethrough opening into the bore in the valve body. A plate 20 having a central opening therein overlies, and is connected to, the axially outer end of the valve body.

The plug 11 is tapered at its axially inner end to fit snugly within the tapered portion of the bore in the valve body. The other end of the plug has a shaft 21 to which a handle 22 for rotating the plug is attached. A coiled compression spring 23 surrounds the shaft 21 and urges the plug into tight engagement with the tapered portion of the bore in the valve body. The axially inner end of the plug 11 is provided with an axially extending recess 24 of cylindrical shape. A slot is cut through the side wall of the recess. This slot has a rectangular portion 25 and a circumferentially extending portion 26. The latter is generally triangular, elongated in a circumferential direction (see Figures 2 and 6 to 8). The two portions of the slot are arranged so that as the plug is rotated the slot will move across the inner end of the passageway 19.

The sleeve 12 is cylindrical, and has an axial passageway 28 therethrough. The axially inner end of the sleeve is seated in the portion 15 of the bore and fixed therein by means of a set screw 27 threaded into the side of the valve body.

The sleeve 12 is a relatively tight rotating fit within the recess 24 in the plug 11. The axially outer end of the sleeve extends past the passageway 19. A deep notch 29 is cut in the wall of the sleeve at the axially outer end of the sleeve. The axially inner edge of the notch 29 is inclined (see Figures 3 and 6 to 8 especially) and is indicated by numeral 30. The sleeve 12 is arranged within the valve body as that the edge of the notch 29 adjacent the near side of the passageway 19 is spaced angularly about 20° therefrom.

Figures 6 to 8 illustrate diagrammatically three of the many positions of the plug 11 relative to the valve body and sleeve. When the parts are in the position shown in Figure 6, the slot in the valve plug overlies a portion of the notch 29 but does not register with the passageway 19. In this position the valve is closed because gas cannot leave the passageway 19.

Rotation of the valve plug toward open position brings the rectangular portion 25 of the slot into registry with the inner end of the passageway. An angular movement of approximately 45° opens the valve to its maximum opening (see Figure 7). Gas leaves the passageway 19 through that part of the slot in the valve plug which registers therewith, flows along the portion 26 of the slot which lies between the passageway 19 and notch 29 and enters the sleeve through those parts of the slot and the notch 29 which are in registry. The area of the slot through which gas flows is cross-hatched in Figure 7.

Further rotation of the valve plug in the same direction will leave a relatively large part of the passageway 19 and slot in registry, but will immediately begin to reduce the area of the slot that is in registry with notch 29. That is so because the portion 26 of the slot is tapered and inclined in the opposite direction. Thus it will be evident that the quantity of gas can be reduced by rotating the plug past its wide open position.

Figure 8 illustrates diagrammatically the position of the plug in "simmer" and "stop" position. In this position the only gas that can pass through the valve is that which can pass between the tip of the portion 26 of the slot and the edge of the notch 29. A suitable stop (not shown) prevents further rotation of the valve in this direction.

Reversing the direction of the rotation of the valve plug first increases the gas flow and then shuts it off.

It will be evident that by reversing the arrangement of the sleeve and plug slot, or by arranging the plug so that it can be turned in the opposite direction to move between opened and closed position, metering can be effected all the way between opened and closed positions. It is preferred, however, to first fully open the valve and then slowly close it to meter the fuel, because this insures positive lighting of the burner from the pilot light usually provided.

From the foregoing it will be seen that the present invention provides a novel valve for metering gaseous fuel in which regulation of the fuel is accomplished throughout a degree of rotation of approximately 135° instead of the usual 20° to 25°. Thus more accurate fuel regulation is accomplished.

The scope of the invention is indicated in the appended claims.

I claim:

1. A metering valve for gaseous fuel comprising a tubular valve body having a fuel inlet port in a side thereof, a non-rotatable sleeve in said valve body coaxial therewith, said sleeve having an inlet port therein spaced angularly from said first mentioned port, the inlet port in said sleeve having two adjoining edges which make an angle therebetween of less than 180° and a rotatable plug coaxial with said valve body, said plug having a tubular wall located between the valve body and the sleeve, said wall having an opening therethrough of greater extent angularly of said plug than the distance between said ports, the width of said opening being greater at one angular extremity than at the other, the opening in the tubular wall of said plug having two edges which form an acute angle therebetween and which intersect both of the said edges in the sleeve inlet port when the valve is set for wide open position.

2. A metering valve as defined in claim 1 wherein the width of said opening in said plug wall decreases substantially uniformly from a point adjacent the wider end to the other.

3. A metering valve for gaseous fuel comprising a tubular valve body having a fuel inlet port in a side thereof, a sleeve in said valve body coaxial therewith and spaced radially therefrom, said sleeve having a port therein spaced angularly from said first mentioned port and being fixedly connected to said valve body, the port in said sleeve having an inclined edge extending partially around said sleeve and a second edge making an angle of less than 180° with the inclined edge, and a rotatable plug coaxial with said valve body, said plug having a tubular wall between said valve body and said sleeve, said plug wall being provided with an opening therein extending angularly partially therearound and being inclined oppositely to said inclined edge of the port in the sleeve, the opening in the plug wall having two edges which form an acute angle, the inclined and second edges of the port in said sleeve being out of parallelism with both edges of the plug opening in all relative positions of the sleeve and plug.

4. A metering valve as defined in claim 3 wherein the opening in the plug wall decreases in width from one angular extremity to the other.

5. A metering valve as defined in claim 4 wherein the opening in the plug includes an axially extending rectangular portion joining the opening in the plug wall at its widest angular extremity.

BASIL D. FIGG.

REFERENCES CITED

The following references are of record in the file of this patent:

UNITED STATES PATENTS

| Number | Name | Date |
|---|---|---|
| 26,654 | Cridge | Jan. 3, 1860 |
| 1,354,522 | Takala | Oct. 5, 1920 |
| 1,792,906 | Heilos | Feb. 17, 1931 |
| 2,153,926 | Kegresse | Apr. 11, 1939 |